2,992,987
LUBRICATING OIL ADDITIVE CONCENTRATE
Joseph E. Fields, Dayton, Ohio, assignor to Monsanto Chemical Company, St. Louis, Mo., a corporation of Delaware
No Drawing. Filed June 26, 1958, Ser. No. 744,637
8 Claims. (Cl. 252—56)

This invention relates to a compatible lube oil additive concentrate having more than one additive component. More particularly the invention relates to a concentrate having a polyacrylate as a viscosity index improver and an ester of ethylene-maleic anhydride copolymer as a pour point depressant and/or as a low temperature detergent. A lubricating oil additive concentrate consists of a base oil containing a high percentage of additives. Usually these additives are most conveniently manufactured in a base oil. These concentrates are then used by blenders to add to their lubricating oil base stocks as a convenient way of incorporating or dissolving the additive in the base stocks. The resultant product is a lubricating oil containing the small percentages of additives required for use by the retail trade, e.g. as automobile crankcase lube oils, automatic transmission oils, hydraulic oils, etc.

It is generally known that when two different high polymers are blended incompatibility is the rule rather than the exception. Incompatibility is manifested by inhomogeneity of the blend and this is reflected in poor physical properties and separation of phases in the presence of a solvent.

An interesting statement of the problem is given by Dobry and Boyer-Kawenoki, Journal of Polymer Science, 2, 90 (1947), from which the following excerpts are taken. "The incompatibility of certain high polymers toward each other has been observed for a long time, especially in the field of varnishes and paint. Experiments to improve such products by blending different constituents have often been frustrated by their incompatibility. This incompatibility can be easily recognized by the fact that films obtained from mixtures are not homogeneous but turbid or opaque and possess mechanical properties which are inferior to those films obtained from the separate constituents. Technical reviews often contain information concerning compatibility but only from the special point of view of technical interest. This information is spread over a great number of publications. . . . No effort has apparently been made so far to make a methodical study of compatibility." The authors further state: "In the absence of a chemical reaction, two solutions of small molecules are always miscible, provided they are far enough from saturation. In other words, an unsaturated solution of a material of low molecular weight can always dissolve a quantity of some other substance which is comparable with the amount which can be dissolved in the pure solvent. Our experiments show that this is not true for macromolecules and that a polymer solution which is still far from its saturation point is, in general, almost totally impenetrable to another high polymer. This phenomenon causes incompatibility; it reveals a characteristic property of macromolecules." The authors proceeded to present experimental evidence on a variety of high polymers and solvents, thereby establishing the generality of the behavior that when polymers of two different species are dissolved in a common solvent the resulting solution usually separates into two phases. Films formed from such polymer blends were turbid or opaque. Further, the phenomenon was noted with more than two polymer species; thus, three polymers in a solvent separated into three separate phases. This phenomenon of phase separation when polymers of different species are dissolved in a common solvent has since come to be known as the Dobry effect. The authors concluded that: "There is no obvious relationship between the compatibility of two polymers and the chemical behavior of their monomers. The similarity of the principal chains is not sufficient to insure the miscibility of two polymers. . . . The similarity of substituents is also insufficient . . . In the few exceptional cases of high miscibility, one cannot see any structural analogy." The investigation has been extended by various other workers. Thus R. J. Kern and R. J. Slocombe in the Journal of Polymer Science, 15, 183 (1955), state: "The generality of phase separation is testified by over twenty systems . . . which are in addition to those reported by Dobry. It is apparent that phase separation occurs even though the monomer units of the polymer pairs are very similar chemically . . . Only three pairs were miscible in all solvents and concentrations tried . . . This phenomenon is not limited to two phases. Polyvinyl acetate, polystyrene, poly-2-methyl-5-vinylpyridine and polymethyl vinyl ketone in dioxane form a four-phase system." To the present time, no criteria have been presented to the art by which it can be determined whether or not two high polymers will or will not be compatible, and the presumption is always that they will not be.

It is an object of this invention to provide for use in lubricating oils an economical one-package multicomponent additive concentrate having pour point depressant and/or low temperature detergent and viscosity index improver characteristics.

This and other objects of the invention will become apparent as the detailed description of the invention proceeds.

It has now been discovered that there are two types of polymers, one a viscosity index improver and the other a pour point depressant and/or low temperature detergent which can be blended in a concentrated form in an oleaginous base stock. Broadly, the present invention is a compatible lubricating oil additive concentrate having more than one additive component. The viscosity index improver is a polymer of acrylic acid esterified with a long-chain alcohol having an average of at least 8 and preferably not more than about 18 carbon atoms per molecule, and the pour point depressant and/or temperature detergent is an ester of an ethylene-maleic anhydride copolymer. The total amount of these additive components in the oleaginous base stock is from about 15% to about 50% by weight based on the concentrate, preferably about 20% to about 40%. Normally, it will be preferred that the ratio of the pour point depressant and/or low temperature detergent to the V.I. improver be not more than about 15 to about 20 parts by weight of the pour depressant and/or low temperature detergent copolymer ester per 100 parts by weight of V.I. improver polymer for satisfactory stability.

The additive concentrates of the invention are particularly satisfactory for use in mineral lubricating oil of insufficiently high viscosity index and containing appreciable amounts of wax; however, they can also be used in synthetic lubricants such as esters, polyethers, etc., since generally additives compatible in one solvent as an exception to the so-called Dobry effect will be compatible in other solvents. In many cases it will be desirable to make the additive concentrate in the oil in which the concentrate is to be used to avoid contamination or dilution by appreciable quantities of the other oil, but this is not always so. Of the mineral lubricating oils, paraffin, naphthenic, or mixed paraffinic and naphthenic oils can be used as the oleaginous base stock in making a concentrate, but the concentrates can also be made in lighter liquid hydrocarbons such as diesel oil, domestic heater oil, mineral seal oil, kerosene, and the like. In fact the oleaginous base stock can be most any oily solvent which does not undesirably dilute the lubricating oil in which the additive concentrate is used.

The polyacrylate which is the viscosity index improver of the concentrate can be made entirely of a polymer of acrylic acid esterified with a higher alcohol, or the polyacrylate can be made from a copolymer of acrylic acid esterified with a long-chain alcohol and a minor amount (less than about 30%, preferably about 10%) of acrylic acid or methacrylic acid esterified with a lower alcohol such as methyl alcohol, ethyl alcohol, the propyl alcohols, the butyl alcohols, etc. However, it has been determined that the polyacrylate to be compatible with the ester of the ethylene-maleic anhydride copolymer must have been made from a monomer or monomers which have been esterified with an alcohol having at least 8 carbon atoms per molecule or a mixture of alcohols having an average of at least 8 carbon atoms per molecule. Normally an alcohol having more than 24 carbon atoms per molecule will not be used, and preferably not more than 18 carbon atoms per molecule. These alcohols can be either straight or branched chain saturated hydrocarbon alcohols. For good viscosity index improving properties normally it will be preferred to use a polyacrylate having an average molecular weight within the range of about 15,000 to about 100,000, preferably 20,000 to about 70,000. These polyacrylates and their method of manufacture are well known in the art, as exemplified in the teachings of U.S. 2,091,627.

The ester of ethylene-maleic anhydride copolymer which is the pour point depressant and/or low temperature detergent component of the concentrate will preferably have a molecular weight below 10,000 molecular weights of 2,000 to 3,000 being quite satisfactory, although 15,000 to 20,000 or higher molecular weight material is effective, particularly if the low temperature detergency is desired but also for the pour point depressancy. The ethylene-maleic anhydride copolymer itself, i.e., before esterification, should have a specific viscosity greater than about 0.05 for a 1% solution of the copolymer in dimethylformamide at 25° C., preferably in the range of about 0.09 to about 0.5. If the copolymer is to be used as a pour point depressant it is esterified to 80% or more, preferably 90 to 100% with a mixture of straight-chain saturated hydrocarbon alcohols having from about 8 to 24 carbon atoms per molecule, preferably 10 to about 20 per molecule. The chain length of the alcohol for the detergent should be in the range of about 8 to about 24 carbon atoms per molecule, preferable about 10 to about 20. U.S. 2,615,845 teaches the preparation of pour depressants of the ethylene-maleic anhydride copolymer ester type. For use as a low temperature detergent the copolymer should not be esterified more than about 80 to about 95% with the alcohol, preferably about 85%, and the free carboxyl groups left unesterified will give the copolymer detergency properties; however, the additive can be made by esterifying only 50% with alcohol. Alternatively the unesterified carboxyl groups can be reacted with such materials as ethylene or propylene oxide alcohol esters, such as "Cellosolves" or "Carbitols," $HOCH_2CH_2N(CH_3)_2$, a lower-dialkylamino-lower-alkyleneamine such as $NH_2CH_2CH_2CH_2N(CH_3)_2$, to esterify the remaining hydroxyl groups giving amides or imides.

There are several base oils which are used repeatedly in the examples which follow, and these are described in detail as follows:

*Base oil No. 1.*—This oil is a 200° F. minimum flash point petroleum distillate hydraulic oil meeting the base oil specifications for Government specification MIL-O-5606 lubricants, having the following properties:

| | |
|---|---|
| Viscosity at 210° F. _____centistokes____ | 1.35 |
| Viscosity at 100° F. _____do____ | 3.68 |
| Refractive index $n_D^{25}$ _____ | 1.4656 |
| Specific gravity, 60°/60° F. _____ | 0.862 |
| Flash point, Cleveland open cup _____° F.____ | 205 |

*Base oil No. 2.*—This is a solvent refined Mid-Continent Oil having the following properties:

| | |
|---|---|
| Viscosity at 210° F. SUS _____ | 39.2 |
| Viscosity at 100° F. SUS _____ | 101.6 |
| Viscosity index _____ | 80.3 |
| Specific gravity 25°/25° C. _____ | 0.886 |
| Flash point, Cleveland open cup _____° F.____ | 375 |

*Base oil No. 3.*—This oil is a solvent refined Mid-Continent Oil having the following properties:

| | |
|---|---|
| Viscosity at 210° F. _____centistokes__ | 10.35 |
| Viscosity at 100° F. _____do____ | 90.14 |
| Flash point, Cleveland open cup _____° F.____ | 450 |

The invention will be more clearly understood from the folowing detailed description of specific examples thereof.

EXAMPLE 1

*Preparation of poly-2-ethylhexylacrylate*

To a one-liter flask equipped with thermometer, stirrer, gas-inlet, reflux condenser and addition funnel was chaged 26.3 g. of 2-ethylhexylacrylate and 188.4 g. of base oil No. 1. The contents of the flask were stirred and held at a temperature of about 76° for a period of about 45 minutes. Then addition of catalyst (0.026 g. benzoyl peroxide) and additional monomer (50.2 g.) from the addition funnel was begun and continued over the period of about one hour. The flask and contents were alternately evacuated and swept with nitrogen after the catalyst addition. Temperature of the reaction mixture increased slightly to about 78°. A second batch of 48.7 g. of monomer and 0.025 g. of benzoyl peroxide catalyst was added to the addition funnel and this monomer and catalyst was added to the contents of the flask over a period of about an hour. The temperature in the flask rose to about 80°. Heating of the flask contents was continued for about 3 hours and 20 minutes more with periodic sampling of the flask contents for refractive index to determine if the polymerization of the monomer was substantially complete. The last sample before shutdown indicated that 95% of the monomer had reacted. The characteristics of the product polymer as a V.I. improver are indicated in the following table:

| Percent Polymer in base oil No. 1 [1] | Viscosity, Centistokes | | V.I. |
|---|---|---|---|
| | at 100° F. | at 210° F. | |
| 0 | 3.68 | 1.35 | 99.0 |
| 3 | 6.41 | 2.27 | 176.5 |
| 6 | 10.20 | 3.49 | 226.2 |

[1] This percentage, as are all others so designated throughout this specification, is based on the pure polymer added to the base oil, not the polymer concentrate.

EXAMPLE 2

*Preparation of 90% 2-ethylhexylacrylate/10% ethylacrylate copolymer*

Using similar equipment to that used in Example 1 but with the addition of a cold finger to the apparatus, 157.7 g. of 2-ethylhexylacrylate, 18.2 g. of ethylacrylate, and 253 g. of base oil No. 1 were mixed together thoroughly. A sample of 183.1 g. of the mixture was then added to the reaction flask and the flask contents were raised to a temperature of 75° C. and benzoyl peroxide catalyst in an amount of 0.037 g. was added to the flask. The flask contents were stirred over a period of about 25 minutes and the temperature gradually increased to about 78° C. Benzoyl peroxide catalyst in the amount of 0.051 g. dissolved in 1 ml. of benzene was added to the remaining 300 ml. of base oil and monomer mixtures, and this was added by dropping funnel at the rate of approximately two and a half ml. a minute. The temperature in the flask gradually rose to 80° C. as the mixture was added from the dropping funnel over a period of two hours and 20 minutes. The flask contents were thereafter sampled periodically to determine when the polymerization reaction was substantially complete, that is, that substantially all the monomer was reacted. About four hours later refractive index sampling indicated the reaction was complete. During this time the temperature of the reaction mixture was gradually raised to 90° C. Viscosity index determinations were made at 3% and 6% concentrations of the polymer in base oil No. 1 and the results of these determinations are as follows:

| Percent Polymer in base oil | Viscosity, Centistokes | | V.I. |
|---|---|---|---|
| | at 100° F. | at 210° F. | |
| 0 | 3.68 | 1.35 | 99.0 |
| 3 | 6.93 | 2.46 | 187.7 |
| 6 | 11.53 | 4.03 | 245.2 |

EXAMPLE 3

*Preparation of 80% 2-ethylhexylacrylate/20% ethylacrylate copolymer*

Using similar equipment to that used in Example 2, 141.5 g. of 2-ethylhexylacrylate, 35.5 g. of ethylacrylate and 256.0 g. of base oil No. 1 was added to the flask. The temperature of the flask content was gradually raised with stirring to 76° over a period of about 20 minutes and 0.133 g. of benzoyl peroxide catalyst was added to the flask. Nitrogen flushing of the flask was used as in Examples 1 and 2. The 2-ethylhexylacrylate contained less than 5 parts per million of hydroquinone polymerization inhibitor, and the other monomer contained approximately 14 parts per million of the hydroquinone polymerization inhibitor. Over a period of about 2 hours the flask contents were raised to a temperature of about 85° C. At this time 0.044 g. of additional catalyst was added. Heating was continued for an additional 4½ hours with temperature being gradually raised to 90° C. Sampling at this time indicated that the polymerization reaction was complete. To the final product was added 0.265 g. of "Paranox 441," a commercially available antioxidant marketed by the Enjay Chemical Co. and reputed to be 2,6-di-t-butyl-4-methylphenol. Viscosity determinations on the base oil and with the polymer incorporated therein are as follows:

| Percent Polymer in base oil No. 1 | Viscosity, Centistokes | | V.I. |
|---|---|---|---|
| | at 100° F. | at 210° F. | |
| 0 | 3.68 | 1.35 | 99.0 |
| 3 | 6.81 | 2.48 | 197.2 |
| 6 | 11.38 | 4.09 | 250.1 |

EXAMPLE 4

*85/15 2-ethylhexyl/acrylate/ethyl/acrylate copolymer prepared at 90° C.*

85.0 grams of 2-ethylhexyl acrylate and 15.3 grams of ethyl acrylate and 150.1 grams of base oil No. 1 were charged to a flask fitted with stirrer, thermometer, cold finger, condenser, and nitrogen bubbler. The system was swept with $N_2$ while being heated to 90° C. in a regulated water bath. When the temperature reached 90° C., 0.05 gram of benzoyl peroxide was added and vacuum was applied for approximately 4 minutes to rid the system of air. Polymerization began after 4 minutes, vacuum was released under nitrogen, and reaction proceeded at 90° C. for 2½ hours. An additional 0.025 gram of the peroxide was added and the reaction held for a total time of 6 hours. A refractive index of 1.4630 indicated a 97.1% conversion. The product was a 40% polymer concentrate in No. 1 base oil. A diluted concentrate having 7.5% polymer in base oil No. 1 had a 13.91 cs. viscosity at 100° F. and 4.91 cs. at 210° F.

EXAMPLE 5

*90/10 tridecyl acrylate/ethyl acrylate at 88° C.*

90 grams of tridecyl acrylate and 10 grams of ethyl acrylate and 100 grams of benzene was charged to a flask fitted with stirrer, nitrogen purge, thermometer and reflux condenser. The flask and contents were heated to the polymerization temperature of 88° C. and vacuum purged under nitrogen to remove oxygen. Lauroyl peroxide (0.075 gram) was added and the reaction continued for 1½ hours. An additional 0.025 gram of catalyst was added and the reaction was continued for a total of 6 hours. Then 100 grams of base oil No. 2 was added and the benzene solvent removed by vacuum distillation to give a 50% oil concentrate. The polymer concentrate was added to base oil No. 3 in an amount to give a 3% concentration of polymer in oil and viscosity determination made resulting in 121.51 cs. at 100° F. and 14.26 cs. at 210° F.

EXAMPLE 6

*90/10 tridecyl acrylate/ethyl acrylate at 85° C.*

The polymer in this example was prepared in a manner similar to that of Example 5, except that the polymerization temperature was 85° C. rather than 88° C. A 3% concentration of the polymer in base oil No. 3 had viscosities of 143.07 cs. at 100° F. and 17.13 cs. at 210° F.

EXAMPLE 7

*90/10 tridecyl acrylate/ethyl acrylate at 82.5 C.*

The polymer in this example was prepared in a manner similar to that of Example 5, except that the polymerization temperature was 82.5° C. rather than 88° C. A 3% concentration of the polymer in base oil No. 3 had viscosities of 152.03 cs. at 100° F. and 18.24 cs. at 210° F.

EXAMPLE 8

*90/10 tridecyl acrylate/ethyl acrylate at 80° C.*

The polymer in this example was prepared in a manner similar to that of Example 5, except that the polymerization temperature was 80° C. rather than 88° C. A 3% concentration of the polymer in base oil No. 3 had viscosities of 156.54 cs. at 100° F. and 18.89 cs. at 210° F.

EXAMPLE 9

*Polydecyl acrylate*

The polymer in this example was prepared from oxodecyl acrylate in a manner similar to that of Example 5, except that the polymerization temperature was 80° C. rather than 88° C. A 5.0% concentration of the polymer in base oil No. 1 had viscosities of 6.90 cs. at 210° F. and 20.64 cs. at 100° F.

EXAMPLE 10

*70/30 2-ethylhexyl acrylate/ethyl acrylate, 40% in kerosene*

57.1 parts of kerosene, 28.0 parts of 2-ethylhexyl acrylate, and 12.0 parts of ethyl acrylate were charged to a 50 gal. glass-line Pfaudler kettle, properly equipped for steam heat, cooling, and reflux. The charge was brought to 105° C. and benzoyl peroxide catalyst was added according to the following schedule:

Catalyst solution: 0.3 part catalyst in 2.6 parts toluene;

1st addition, ⅓ of catalyst solution at 105° C., reacted for 1 hour, 2nd addition and 5 consecutive additions, ⅑ of the catalyst solution was added at temperatures between 105° and 115° C. After each addition the reaction was allowed to continue for at least ½ hour. After all the catalyst was in, the heating was continued for 1 additional hour at 105° C., giving a total reaction time at 105° to 115° C. of 5 hours. The reaction mixture was then filtered and used as a 40% concentrate in kerosene.

EXAMPLE 11

*90/10 oxo-decyl/acrylate/ethyl acrylate at 80° C.*

The polymer in this example was prepared in a manner similar to that of Example 5 except that oxo-decyl acrylate was used instead of tridecyl acrylate and the polymerization temperature was 80° C. rather than 88° C. Also the concentrate was a 30% concentrate in base oil No. 2 rather than a 50% concentrate. A 3.0% concentration of the polymer in base oil No. 3 gave viscosities of 174.0 cs. at 100° F. and 24.34 cs. at 210° F.

In esterifying the ethylene-maleic anhydride copolymers, a number of different straight-chain alcohol blends were used which are set forth by composition in Table I as follows:

TABLE I.—ALCOHOL BLENDS

| Blend No. | Percent Composition | | | | | OH, Percent | Mol. Wt. |
|---|---|---|---|---|---|---|---|
| | $C_{10}$ | $C_{12}$ | $C_{14}$ | $C_{16}$ | $C_{18}$ | | |
| 1 | 5 | 95.0 | | | | 8.87 | 192 |
| 2 | 1.5 | 71.0 | 27.0 | 0.5 | | 8.62 | 197 |
| 3 | 2.6 | 61.0 | 23.0 | 11.2 | 2.2 | 8.37 | 203 |
| 4 | 19.8 | 55.0 | 15.9 | 7.8 | 1.5 | 8.70 | 195 |
| 5 | 2.5 | 55.5 | 21.0 | 10.2 | 10.8 | 8.14 | 209 |
| 6 | 1.2 | 56.8 | 20.6 | 0.4 | 21.0 | 8.06 | 211 |
| 7 | 1.2 | 56.8 | 21.6 | 20.4 | | 8.24 | 206 |
| 8 | 2.0 | 51.0 | 15.3 | 15.8 | 15.9 | 7.94 | 214 |
| 9 | 11.1 | 50.0 | 18.7 | 10.2 | 10.0 | 8.33 | 204 |
| 10 | 3.0 | 65.7 | 20.2 | 10.6 | 0.5 | | |

EXAMPLE 12

*Preparation of ethylene-maleic anhydride copolymer*

This example illustrates the preparation of ethylene-maleic anhydride copolymer having a specific viscosity of about 0.1, the specific viscosity being determined from a 1% solution of the polymer in dimethylformamide at 25° C.

A 300 p.s.i.g., 50 gallon "Glascote" reactor fitted with auxiliary equipment for temperature control, reflux, liquid reactant addition, stirrer, and ethylene gas feed was used. The reactor was charged with 355 pounds of ethylene dichloride, 50 pounds of maleic anhydride, and 5.75 lbs. of n-butyraldehyde as a chain stopper. The reactor was purged twice with ethylene to rid the system of oxygen and brought to operating conditions (80° C. and 200 p.s.i.g.) under ethylene pressure. Catalyst, 840 grams of benzoyl peroxide in 20 pounds of ethylene dichloride, was added. The reaction proceeded for 10½ hours with the pressure being maintained at 200 p.s.i.g. by added ethylene. The product slurry was drained and filtered to remove most of the ethylene dichloride, then vacuum dried. Yield was 56.6 lbs. of 0.094 specific viscosity polymer (the specific viscosity being determined as described above in this example).

EXAMPLE 13

*Preparation of ester of ethylene-maleic anhydride copolymer for use as a pour point depressant*

To the flask equipped with a stirrer and reflux condenser was added 203 g. (1 mole) of the number 3 alcohol blend from Table I, 63 g. (0.5 mole) of the copolymer of Example 12, 100 ml. of xylene and 1 g. of toluene sulfonic acid esterification catalyst. The contents of the flask were gradually heated with stirring from about 80° C. to 180° C. over a period of about 6½ hours. Water and some xylene were removed as condensate. At this point 3 ml. of a long-chain polyamine was added to kill off the catalyst, but it was later determined that this step was unnecessary. The flask was heated for an additional ½ hour at 190° C. and 200 g. of base oil No. 2 was added. The reaction product was distilled at 200° C. with 5 mm. of vacuum, and a residue 415 g. was recovered as the product after the distillation. 15 g. of the base oil was added to this residue product to give a 50% concentrate of the pour point depressant in the oil. This mixture was filtered to clarify it. The final product had an acid number of 21.2 indicating 91.1% esterification.

| Percent Copolymer Ester in Oil No. 3 [1] | Pour Point, ° F. | |
|---|---|---|
| | ASTM | Stable Pour |
| 0 | 25 | 25 |
| 0.25 | −10 | −10 |
| 0.125 | −5 | −10 |
| 0.05 | −5 | −10 |
| 0.025 | 0 | −10 |

[1] This percentage, as are all others so designated throughout this specification, is based on the pure copolymer ester added to the base oil, not the copolymer ester concentrate.

EXAMPLE 14

*Preparation of ester of ethylene-maleic anhydride copolymer using alcohol blend No. 4 from Table I*

In a similar manner to that used in Example 13, a sample of ethylene-maleic anhydride copolymer prepared as in Example 12 was esterified with the No. 4 alcohol blend of Table I to give 404 grams of 50% concentrate pour point depressant. The final product had an acid number of 21.4 indicating 91.0% esterification.

| Percent Copolymer Ester in Oil No. 3 | Pour Point, ° F. | |
|---|---|---|
| | ASTM | Stable Pour |
| 0 | 25 | 25 |
| 0.25 | −15 | −10 |
| 0.125 | −15 | −10 |
| 0.05 | −10 | −10 |
| 0.025 | 0 | −10 |

EXAMPLE 15

*Preparation of pour point depressant using alcohol blend No. 2 from Table I.*

In a similar manner to that used in Example 13, an ester of the ethylene-maleic anhydride-copolymer of Example 12 was prepared using alcohol blend No. 2 from Table I to give a 50% concentrate pour point depressant. The final product had an acid number of 19.8 indicating 91.7% esterification.

| Percent Copolymer Ester in Oil No. 3 | Pour Point, ° F. | |
|---|---|---|
| | ASTM | Stable Pour |
| 0 | 25 | 25 |
| 0.25 | −10 | −10 |
| 0.125 | −10 | −10 |
| 0.05 | −10 | −10 |
| 0.025 | −10 | −10 |

EXAMPLE 16

*Pour point depressant preparation using alcohol blend No. 1*

In a manner similar to that described in Example 13, ethylene-maleic anhydride copolymer as prepared in Example 12 was esterified with a No. 1 blend alcohol from Table I to give a 50% concentrate pour point depressant. The final product had an acid number of 22.6 indicating 90.5% esterification.

| Percent Copolymer Ester in Oil No. 3 | Pour Point, °F. | |
|---|---|---|
| | ASTM | Stable Pour |
| 0 | 25 | 25 |
| 0.25 | +20 | -5 |
| 0.125 | +20 | 0 |
| 0.05 | +20 | 0 |
| 0.025 | +20 | 0 |

EXAMPLE 17

*Preparation of pour point depressant using alcohol blend No. 9*

In manner similar to that used in Example 13 ethylene-maleic anhydride copolymer as prepared in Example 12 was esterified with alcohol blend No. 9 from Table I to produce a 50% concentrate pour point depressant. The final product had an acid number of 22.7 indicating 90.5% esterification.

| Percent Copolymer Ester in Oil No. 3 | Pour Point, °F. | |
|---|---|---|
| | ASTM | Stable Pour |
| 0 | 25 | 25 |
| 0.25 | -10 | -10 |
| 0.125 | -5 | -10 |
| 0.05 | -5 | -10 |
| 0.025 | 0 | -10 |

EXAMPLE 18

*Preparation of pour point depressant from alcohol blend No. 5*

In a similar manner to that used in Example 13 ethylene-maleic copolymer from Example 12 was esterified by alcohol blend No. 5 from Table I to produce 422 g. of the 50% concentrate pour point depressant. The final product had an acid number of 20.1 indicating 91.5% esterification.

| Percent Copolymer Ester in Oil No. 3 | Pour Point, °F. | |
|---|---|---|
| | ASTM | Stable Pour |
| 0 | 25 | 25 |
| 0.25 | -10 | -10 |
| 0.125 | -5 | -10 |
| 0.05 | 0 | -10 |
| 0.025 | +5 | -10 |

EXAMPLE 19

*Preparation of pour point depressant using alcohol blend No. 7*

In a similar manner to that described in Example 13, ethylene-maleic anhydride produced in the manner described in Example 12 was esterified with alcohol blend No. 7, the composition of which is set forth in Table I to produce 418 g. of a 50% polymer concentrate pour point depressant. The final product had an acid number of 24.7 indicating 89.6% esterification.

| Percent Copolymer Ester in Oil No. 3 | Pour Point, °F. | |
|---|---|---|
| | ASTM | Stable Pour |
| 0 | 25 | 25 |
| 0.25 | -5 | -10 |
| 0.125 | -5 | -10 |
| 0.05 | 0 | -10 |
| 0.025 | +5 | -10 |

EXAMPLE 20

*Preparation of pour point depressant using alcohol blend No. 8*

In a similar manner to that described in Example 13, ethylene-maleic anhydride prepared as in Example 12 was esterified with a mixture of alcohols described as alcohol blend No. 8 in Table I to produce 440 g. of 50% polymer concentrate pour point depressant. The final product had an acid number of 23.4 indicating 90.0% esterification.

| Percent Copolymer Ester in Oil No. 3 | Pour Point, °F. | |
|---|---|---|
| | ASTM | Stable Pour |
| 0 | 25 | 25 |
| 0.25 | -5 | -10 |
| 0.125 | -5 | -10 |
| 0.05 | 0 | -10 |
| 0.025 | +10 | -10 |

EXAMPLE 21

*Preparation of pour point depressant using alcohol blend No. 6*

In a similar manner to that described in Example 13, ethylene-maleic anhydride copolymer prepared as in Example 12 was esterified with a mixture of alcohols which are described as alcohol Blend No. 6 in Table I to give 446 g. of 50% polymer concentrate pour point depressant. The final product had an acid number of 22.1 indicating 90.7% esterification.

| Percent Copolymer Ester in Oil No. 3 | Pour Point, °F. | |
|---|---|---|
| | ASTM | Stable Pour |
| 0 | 25 | 25 |
| 0.25 | -10 | -10 |
| 0.125 | -5 | -10 |
| 0.05 | +5 | -10 |
| 0.025 | +15 | -10 |

EXAMPLE 22

*Preparation of pour point depressant using alcohol blend No. 5 as in Example 18 but not removing the unreacted alcohol*

The pour point depressant was prepared in a similar manner to that described in Example 13 in that ethylene-maleic anhydride prepared in Example 12 was esterified with an alcohol blend composition of which is set forth as No. 5 in Table I but the unreacted alcohol was not stripped from the residue polymer. The temperature of the reaction mixture under vacuum of 10 mm. was raised only to 150° C. to strip off the xylene. This is not a sufficiently high temperature to remove unreacted alcohol. 470 g. of residue product remained in the flask and 50 g. of this is removable alcohol, so there is only 220 g. of polymer in the residue giving approximately 45% concentration. The product was filtered in the usual manner. The final product had an acid number of 22.0 indicating 90.8% esterification.

| Percent Copolymer Ester in Oil No. 3 | Pour Point, ° F. | |
|---|---|---|
| | ASTM | Stable Pour |
| 0 | 25 | 25 |
| 0.25 | −5 | −10 |
| 0.125 | −5 | −10 |
| 0.05 | 0 | −10 |
| 0.025 | +5 | −10 |

EXAMPLE 23

This experiment is similar to Example 13 except that the final temperature reached in the esterification was higher, namely 230° C. in an attempt to more closely approach 100% esterification of the polymer. The mixture of alcohols used to esterify the polymer when this example was alcohol blend No. 3 from Table I. The final residue product was 458 g. containing 258 g. of polymer, and this was adjusted by oil addition to 50% polymer in the concentrate. The acid number of this product was 4.1 indicating 98.2% esterification. No long-chain polyamine was added to this example to kill the catalyst, and it was determined that none was needed.

| Percent Copolymer Ester in Oil No. 3 | Pour Point, ° F. | |
|---|---|---|
| | ASTM | Stable Pour [1] |
| 0 | 25 | 25 |
| 0.25 | 0 | −10 |
| 0.125 | −5 | −10 |
| 0.05 | −5 | 0 |
| 0.025 | −5 | 0 |

[1] These pours were a 2 week stable pour cycle.

EXAMPLE 24

*Preparation of pour point depressant using alcohol blend No. 5*

Like Example 23 it is attempted to approach 100% esterification as closely as possible. The final residue product was 446 g. containing 246 g. of polymer which was adjusted by adding oil to 50% concentration. The acid number of the product was 4.1 indicating 98.2 esterification. No long-chain polyamine was added in this example to kill the catalyst, and it was determined that none was needed.

| Percent Copolymer Ester in Oil No. 3 | Pour Point, ° F. | |
|---|---|---|
| | ASTM | Stable Pour [1] |
| 0 | 25 | 25 |
| 0.25 | +5 | −10 |
| 0.125 | 0 | −10 |
| 0.05 | 0 | −5 |
| 0.025 | −5 | −5 |

[1] These pours were a 2 week stable pour cycle.

EXAMPLE 25

This is an example of the preparation of a low temperature detergent composition. The equipment used was similar to that used in Example 5. To the flask was charged 400 grams of 0.1 specific viscosity ethylene-maleic anhydride copolymer (specific viscosity determined in dimethylformamide at 1% concentration), 1700 grams of alcohol blend 10 of Table I, 150 grams of xylene and 2.0 ml. of 85% $H_3PO_4$. Esterification was carried out in the usual manner, and this intermediate product had an acid number of 22.4. By calculation from this acid number, 90.4% ester was indicated.

To this intermediate product was added 96.6 grams of dimethylaminopropylamine, which was calculated to be sufficient to complete the esterification of the copolymer. The intermediate product was heated to 100° C. before beginning the amine addition, which was made dropwise over a period of about ½ hour with the temperature being gradually raised to 140° C. The esterification was continued in a conventional fashion with a final temperature of 170° C. being reached. After the finish of the esterification 700 grams of base oil No. 2 was added, and the mixture was distilled to 200° C./at 5 mm. vacuum. Then 500 grams more of oil was added after distillation to give a 50% concentrate of the polymer in oil. The acid number of the 50% concentrate was 1.8, indicating about 99.2% esterification. A percent N of 0.55 indicates the product to be 82% ester and 18% substituted imide.

To test the compatibility characteristics of this product with the product of Example 11, a concentrate blend was made. This blend consisted of 100 grams of the product of Example 11 (30% polymer in oil, i.e. 30 grams polymer and 70 grams oil) plus 12 grams of the product of Example 25, which contains 50% polymer in oil (6 grams polymer and 6 grams oil). This blend was thoroughly mixed then allowed to stand without mixing. At the end of 1 day, 3 days and 3 months observations were made of the blend, and each time it was noted the blends were clear without any evidence of settling or layering, indicating complete compatibility.

In an attempt to provide suitable additive concentrates having both viscosity index and pour point improving characteristics a number of additives were blended together. One group of these additive blends are described in detail in Table II which follows:

TABLE II.—COMPATIBILITY DATA ADDITIVE CONCENTRATES

| No. | V.I. Improver, g.[1] | Pour Point Depressant, g.[3] | Parts of Pour Dep. per 100 Parts of V.I. Imp.[3] | Percent Total Polymer in Combined Concentrates | Percent V.I. Improver in Combined Concentrates |
|---|---|---|---|---|---|
| 1 | 100 | 3 | 5 | 30.6 | 29.1 |
| 2 | 100 | 6 | 10 | 31.1 | 28.3 |
| 3 | 100 | 9 | 15 | 31.6 | 27.5 |
| 4 | 100 | 12 | 20 | 32.1 | 26.8 |
| 5 | 100 | 15 | 25 | 32.6 | 26.1 |
| 6 | 100 | 18 | 30 | 33.1 | 25.1 |

[1] Concentrate of Example 11.
[2] Acryloid 150 which is a 50% polymethacrylate concentrate marketed by the Rohm & Haas Company having the following physical properties:

| | |
|---|---|
| Specific gravity, 60° F./60° F. | 0.900 |
| Lbs./gal. | 7.49 |
| Flash point, C.O.C., °F.* | 400 |
| ASTM, pour point, °F.** | +20 |
| Viscosity, cs./100° F. | 5000 |
| Viscosity, cs./210° F. | 700 |
| Color, ASTM | 3 |
| Neutralization No. | 0.2 |

\* When diluted with three parts of a 400° F. flash mineral oil to decrease viscosity and prevent local overheating and cracking.
\*\* Viscosity pour point.

[3] This column is a ratio of pure additives, not concentrates.

This "Acryloid 150" is more accurately defined chemically as a high polymer of a long chain, e.g., cetyl or lauryl, alcohol ester of methacrylic acid. All the concentrate blends of Table II were hazy upon mixing at 90° C., even the blends containing only 5 parts by weight of pour depressant copolymer ester per 100 parts by weight of V.I. improver polymer. At the end of two weeks actual layer separation was evident in all samples. It was concluded that the Dobry effect does not allow for mixing of these concentrations in the above compositions.

A series of concentrate blends were prepared exactly as in Table II except that Santopour C was substituted for Acryloid 150 as the pour point depressant. Santopour C is a petroleum oil pour point depressant marketed by the Monsanto Chemical Company and having the following physical characteristics:

Gravity API° _____ 24.
Specific gravity, 60°/60° F. _ 0.91 (7.6 pounds per gal.).
Flash point, C.O.C. _____ 360° F.
Color, ASTM (diluted) _____ 4.
Viscosity, 210° F. _____ 1020 SUS.
Ash _____ 0.01%.
Neutralization number _____ 0.05.

The results as to compatibility were the same as the concentrates of Table II and at the end of two weeks actual layer separation had occurred in all blends.

TABLE III

| No. | Parts of Pour Dep. per 100 Parts of V.I. Imp.[1] | Clarity on Mixing | Compatibility Ratings [2] | | | |
|---|---|---|---|---|---|---|
| | | | 3 days | 2 weeks | 2 months | 6 months |
| 1 | 5 | clear | 1 | 1 | 1 | 1 |
| 2 | 10 | do | 1 | 1 | 1 | 1 |
| 3 | 15 | do | 1 | 1 | 2 | 2 |
| 4 | 20 | do | 2 | 2 | 4 | |
| 5 | 25 | do | 4 | 4 | 7 | |
| 6 | 30 | do | 5 | 5 | 7 | |

[1] The ethylene-maleic anhydride ester concentrate product of Example 13 was the pour depressant, and the V.I. improver of Example 11 was used, but the ratio again is ratio of pure additives, not concentrates.
[2] Compatibility code:
1 Clear
2 Very slight haze
3 Slight haze
4 Haze
5 Two phase structure
6 Two layers separating
7 Complete two layer separation In Table III above is contained data wherein the same V.I. improver was used as in Table II, but the ethylene-maleic anhydride ester concentrate of Example 5 was used instead of Acryloid 150. The samples were made up in an identical manner and in identical amounts as they were in Table II. In Table III, four of the columns contained in Table II have not been included to leave additional room for periodic long-time observations of a compatibility of the samples. The samples are graded in Table III as to compatibility in seven different grades which are set forth in Table III. It should be noted that samples having up to and including 15 parts by weight of pour depressant copolymer ester per 100 parts by weight of V.I. improver polymer in the concentrate are satisfactory whereas those having 20 parts or more per 100 parts are unsatisfactory as to compatibility.

TABLE IV

| No. | Parts of Pour Dep. per 100 Parts of V.I. Imp.[1] | Clarity on Mixing | Compatibility Ratings [2] | | | |
|---|---|---|---|---|---|---|
| | | | 3 days | 2 weeks | 2 months | 6 months |
| 1 | 5 | Clear | 1 | 1 | 1 | 1 |
| 2 | 10 | do | 1 | 1 | 1 | 1 |
| 3 | 15 | do | 1 | 2 | 2 | 2 |
| 4 | 20 | do | 3 | 3 | 5 | |
| 5 | 25 | do | 4 | 4 | 7 | |
| 6 | 30 | do | 4 | 5 | 7 | |

[1] The ethylene-maleic anhydride copolymer ester concentrate of Example 20 was used, and the V.I. improver of Example 11 was used, but the ratio is a ratio of pure additives, not concentrates as in the previous tables.
[2] Compatibility ratings as in Table III.

Additional compatibility data is contained in Table IV above. The same V.I. improver was used as in Table III but the ethylene-maleic anhydride ester copolymer pour point depressant was prepared as in Example 20. Again all the concentrates were compatible up to and including 15 parts by weight of pour point depressant copolymer ester per 100 parts by weight of V.I. improver polymer and 20 parts or higher were not compatible. These results are similar to those reported in Table III.

TABLE V.—COMPATIBILITY DATA ADDITIVE CONCENTRATES

| Polyacrylate V.I. Improver [1] | EMA Ester Pour Point Depressant [3] | Parts of Pour Dep. per 100 Parts of V.I. Imp.[4] | 1 week | 1 month | 2 mos. | 5 mos. |
|---|---|---|---|---|---|---|
| 50 g. (Ex. 1), 20 g. polymer. | 4 g. (Ex. 19), 2 g. polymer. | 10 | Clear | Clear | Clear | Clear. |
| 50 g. (Ex. 2), 20 g. polymer. | do | 10 | do | 2 layers | | |
| 50 g. (Ex. 4), 20 g. polymer. | do | 10 | Cloudy | do | | |
| 50 g. (Ex. 3), 20 g. polymer. | do | 10 | Clear | do | | |
| Do | 8 g. (Ex. 19), 4 g. polymer. | 20 | 2 layers | | | |
| 50 g. (Ex. 10), 20 g. polymer.[2] | 4 g. (Ex. 19), 2 g. polymer. | 10 | do | | | |
| Do.[3] | 8 g. (Ex. 19), 4 g. polymer. | 20 | do | | | |

[1] Polyacrylate in base oil No. 1.
[2] Polyacrylate in kerosene concentrate.
[3] Ethylene-maleic anhydride ester in base oil No. 2.
[4] Again this is a pure additive ratio, not a concentrate ratio.

Table V above contains compatibility data of additive concentrates wherein the type of V.I. improver and the amount of pour point depressant was varied. It should be noted that the only satisfactory concentrate in this table is the first concentrate listed therein. The V.I. improver used in this first concentrate tested was poly-2-ethylhexylacrylate but in all the other concentrates tested the V.I. improver had less than an average of 8 carbon atoms per monomer molecule polymerized or mixture thereof. It should be noted that in the first example where the average number of carbon atoms per monomer molecule was 8 that the concentrate was satisfactory.

TABLE VI.—COMPATIBILITY DATA
[Polyacrylate and Ethylene-Maleic Anhydride Ester Concentrates]

| V.I. Improver [1] | Pour Point Depressant | Parts of Pour Dep. per 100 Parts of V.I. Imp.[2] | 1 day | 1 week | 2 months |
|---|---|---|---|---|---|
| 56 g. (Ex. 9), 20 g. polymer. | 4 g. (Ex. 22), 2 g. polymer. | 10 | Clear. | Clear. | Clear. |
| Do | 8 g. (Ex. 22), 4 g. polymer. | 20 | ---do--- | ---do--- | Do. |
| 56 g. (Ex. 5), 20 g. polymer. | 4 g. (Ex. 22), 2 g. polymer. | 10 | ---do--- | ---do--- | Do. |
| 56 g. (Ex. 8), 20 g. polymer. | ---do--- | 10 | ---do--- | ---do--- | Do. |
| Do | 8 g. (Ex. 22), 4 g. polymer. | 20 | ---do--- | ---do--- | Do. |
| 56 g. (Ex. 7), 20 g. polymer. | 4 g. (Ex. 16), 2 g. polymer. | 10 | ---do--- | ---do--- | Do. |
| 56 g. (Ex. 6), 20 g. polymer. | 4 g. (Ex. 15), 2 g. polymer. | 10 | ---do--- | ---do--- | Do. |

[1] The 56 grams in each case includes 40 grams of 50% concentrate plus 16 grams of base oil No. 2.
[2] As in the other tables this is a pure additive ratio, not a concentrate ratio.

In Table VI above all the concentrates were stable. In all those concentrates mixtures the average number of carbon atoms per molecule in the monomer or monomer mixtures was more than 8. This is a significant difference between a number of the concentrates of Table V which were not compatible as compared to these concentrates which were all compatible. It should be noted here that concentrates having 20 parts by weight of pour depressant copolymer ester per 100 parts by weight of V.I. improver polymer are stable.

TABLE VII.—POUR REVERSION

| V.I. Improver | Percent | Pour Depressant | Percent | ASTM | Stable Pour [2] |
|---|---|---|---|---|---|
| None | | None | | −40 | +5 |
| Ex. 11 | 5.5 | ---do--- | | −45 | +5 |
| Ex. 11 | 5.5 | Acryloid 150 | 0.10 | −45 | 0 |
| Ex. 11 | 6.25 | None | | −30 | 0 |
| Ex. 11 | 6.25 | Santopour C | 0.05 | −40 | +5 |
| Ex. 11 | 6.25 | ---do--- | 0.10 | −40 | 0 |
| Ex. 11 | 6.25 | ---do--- | 0.15 | −40 | 0 |
| Ex. 11 | 6.25 | Acryloid 150 | 0.05 | −40 | +5 |
| Ex. 11 | 6.25 | ---do--- | 0.10 | −40 | −10 |
| Ex. 11 | 6.25 | ---do--- | 0.15 | −40 | −25 |
| Concentrate-V.I. Improver and Pour Depressant in amount of 6.25%.[1] | | | | −40 | −45 |

[1] 250 g. 90/10 decyl acrylate/ethyl acrylate V.I. improver 30% conc. described in Example 11 and 15 g. EMA pour depressant 50% conc. described in Example 20, i.e., EMA ester polymer/V.I. polymer×100=10%.
[2] This is a 2 week cycle.

In Table VII above are contained data showing the effectiveness of the multicomponent additive concentrates of the invention in preventing pour reversion in oils which have a tendency toward pour reversion. In this table polyacrylates as V.I. improvers are combined with well known pour point depressants such as "Acryloid 150" and "Santopour C" for comparison with the concentrate of the invention as to pour reversion. It will be noted that "Santopour C" does not cure the pour reversion problem at all and that "Acryloid 150" even at high concentrations only partially cures the pour reversion problem; whereas, the concentrate of the invention completely cures the pour reversion problem.

TABLE VIII.—POUR DEPRESSANT AND VISCOSITY INDEX DATA USING SINGLE AND TWO COMPONENT CONCENTRATES

| Additive | Percent Conc. V.I. Improver | Percent Conc. Pour Dep. | Viscosity, cs. 210° F. | Viscosity, cs. 100° F. | V.I. | ASTM Pour, °F. | Stable Pour, °F.[1] |
|---|---|---|---|---|---|---|---|
| Ex. 11 and 16 | 3 | 0.3 | 24.69 | 175.97 | 135.9 | −10 | −10 |
| Do | 2 | 0.2 | 18.27 | 137.50 | 132.1 | −10 | −10 |
| Ex. 11 and 20 | 3 | 0.3 | 24.10 | 171.72 | 135.9 | −5 | −10 |
| Do | 2 | 0.2 | 18.49 | 138.79 | 132.3 | −5 | −10 |
| Ex. 11 | 3 | | 24.34 | 174.00 | 135.7 | +25 | |
| Ex. 16 | | 0.25 | | | | −10 | −10 |
| Ex. 20 | | 0.25 | | | | −5 | −10 |

[1] 1 week cycle.

Table VIII shows pour depressant and viscosity index data comparing the use of single and two component concentrates to see if the pour point depressant additives and viscosity index improving additives have any effect on one another when they are both present in an oil. The data of Table VIII indicates that the polyacrylate VI improver has no effect in suppressing the ethylenemaleic anhydride copolymer ester pour point depressant and the pour point depressant has no depressing effect on the VI improving properties of the polyacrylate.

Although the invention has been described in terms of specified examples which are set forth in considerable detail, it should be understood that this is by way of illustration only and that the invention is not necessarily limited thereto, since alternative embodiments will become apparent to those skilled in the art in view of the disclosure. Accordingly, modifications are contemplated which can be made without departing from the spirit of the described invention.

What is claimed is:

1. A compatible lubricating oil additive concentrate consisting essentially of a major amount of a mineral oil base stock and a minor amount in the range of about 15% to about 50% by weight of an additive mixture having as a viscosity index improver a polymer of acrylic acid having a molecular weight in the range of about 15,000 to about 100,000 and esterified with a saturated aliphatic hydrocarbon alcohol having at least 8 and not more than about 18 carbon atoms per molecule and an ethylene-maleic anhydride copolymer having a specific viscosity in the range of about 0.05 to about 1.0 as determined in 1% by weight solution of the copolymer in dimethylformamide at 25° C. and esterified to at least 50% with saturated aliphatic hydrocarbon alcohol having from about 10 to about 20 carbon atoms per molecule, and the ratio of the copolymer ester to the viscosity index improver polymer being not more than about 15 to 20 parts by weight of the copolymer ester per 100 parts by weight of the viscosity index improver polymer.

2. The lubricating oil additive concentrate of claim 1 wherein said additive mixture is present in the range of about 20% to about 40% by weight.

3. The lubricating oil additive concentrate of claim 2 wherein said copolymer has a specific viscosity of about 0.1 as determined in a 1.0% by weight solution of the copolymer in dimethylformamide at 25° C., and the ratio of the copolymer ester to the viscosity index improver polymer is not more than about 15 parts by weight of the copolymer ester per 100 parts by weight of the viscosity index improver polymer.

4. A compatible lubricating oil additive concentrate consisting essentially of a major amount of a mineral oil base stock and a minor amount in the range of about 15% to about 50% by weight of an additive mixture having as a viscosity index improver a polymer of acrylic acid having a molecular weight within the range of about 15,000 to about 100,000 and esterified with a saturated aliphatic hydrocarbon alcohol having at least 8 and not more than about 18 carbon atoms per molecule and as a pour point depressant an ethylene-maleic anhydride copolymer having a specific viscosity in the range of about 0.05 to about 1.0 as determined in 1% by weight solution of the copolymer in dimethylformamide at 25° C. and esterified to at least about 90% with a mixture of straight-chain saturated hydrocarbon alcohols having from about 8 to about 24 carbon atoms per molecule, and the ratio of the pour point depressant to the viscosity index improver being not more than about 15 to about 20 parts by weight of pour point depressant copolymer ester per 100 parts by weight of viscosity index improver.

5. The lubricating oil additive concentrate of claim 4 wherein said additive mixture is incorporated in an amount of about 20% to about 40% of weight, the said mixture of said straight-chain alcohols has carbon chain length in the range of about 10 to about 20 carbon atoms per molecule, said copolymer has specific viscosity of about 0.1 as determined in 1% by weight solution of the copolymer in dimethylformamide at 25° C., and the ratio of the pour point depressant to the viscosity index improver is not more than about 15 parts by weight of pour point depressant copolymer ester per 100 parts by weight of viscosity index improver polymer.

6. The compatible lubricating oil additive concentrate consisting essentially of a major amount of mineral oil base stock and a minor amount in the range of about 15% to about 50% by weight of an additive mixture having as a viscosity index improver a polymer of acrylic acid having a molecular weight in the range of about 15,000 to about 100,000 and esterified with a saturated aliphatic hydrocarbon alcohol having at least 8 and not more than about 18 carbon atoms per molecule and as a low temperature detergent an ethylene-maleic anhydride copolymer having a specific viscosity in the range of about 0.05 to about 1.0 as determined in 1% weight solution of the copolymer in dimethylformamide at 25° C. and esterified to at least 50% but not more than about 95% with a saturated aliphatic hydrocarbon alcohol having about 10 but not more than about 20 carbon atoms per molecule with the remaining free-carboxyl groups being reacted with a lower-dialkylamino-lower-alkyleneamine, and the ratio of the low temperature detergent to the viscosity index improver being not more than about 15 to about 20 parts by weight of low temperature detergent copolymer ester per 100 parts by weight of viscosity index improver polymer.

7. The lubricating oil additive concentrate of claim 6 wherein said additive mixture is incorporated in an amount of about 20% to about 40% by weight, and said copolymer has a specific viscosity of about 0.1 as determined in 1% by weight solution of the copolymer in dimethylformamide at 25° C.

8. The lubricating oil additive concentrate of claim 7 wherein said alcohol for esterifying the polymer of acrylic acid is a mixture of alcohols having an average carbon chain length of at least 8 but not more than about 18 carbon atoms per molecule.

References Cited in the file of this patent
UNITED STATES PATENTS

| | | |
|---|---|---|
| 2,091,627 | Bruson | Aug. 31, 1937 |
| 2,492,789 | Evans et al. | Dec. 27, 1949 |
| 2,600,451 | Horne et al. | June 17, 1952 |
| 2,615,845 | Lippincott et al. | Oct. 28, 1952 |
| 2,616,854 | Fenske | Nov. 4, 1952 |
| 2,655,479 | Munday et al. | Oct. 13, 1953 |
| 2,710,842 | Heisig et al. | June 14, 1955 |
| 2,849,398 | Moody et al. | Aug. 26, 1958 |

OTHER REFERENCES

"I. and E. Chem.," May 1949, vol. 41, No. 5, pages 952–957.
"J. Pol. Sci.," vol. 2, 1947, pages 90–100.
"J. Pol. Sci.," vol. 15, 1955, pages 183–191.